(12) United States Patent
Barcat et al.

(10) Patent No.: US 9,194,726 B2
(45) Date of Patent: Nov. 24, 2015

(54) SUPPORT MEMBER, DETECTION SET COMPRISING SUCH A SUPPORT MEMBER, MANUFACTURING METHOD OF SUCH A DETECTION SET AND BEARING ASSEMBLY INCLUDING SUCH A DETECTION SET

(75) Inventors: Florian Barcat, Tours (FR); Sylvain Chaussat, Tours (FR); Pierrick Maze, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 193 days.

(21) Appl. No.: 13/994,357

(22) PCT Filed: Dec. 17, 2010

(86) PCT No.: PCT/IB2010/003525
§ 371 (c)(1),
(2), (4) Date: Sep. 16, 2013

(87) PCT Pub. No.: WO2012/080778
PCT Pub. Date: Jun. 21, 2012

(65) Prior Publication Data
US 2014/0002066 A1 Jan. 2, 2014

(51) Int. Cl.
*H02K 5/10* (2006.01)
*G11B 33/14* (2006.01)
*G01D 11/30* (2006.01)
*G01D 11/24* (2006.01)
*G01P 1/02* (2006.01)
*G01P 3/44* (2006.01)
*G01P 3/487* (2006.01)
*F16C 41/00* (2006.01)

(52) U.S. Cl.
CPC .............. *G01D 11/30* (2013.01); *F16C 41/007* (2013.01); *G01D 11/245* (2013.01); *G01P 1/026* (2013.01); *G01P 3/443* (2013.01); *G01P 3/487* (2013.01); *Y10T 29/49826* (2015.01)

(58) Field of Classification Search
CPC ....... G01D 5/145; G01D 5/12; G01D 5/2451; G01D 18/008; G01D 9/10; H02K 1/27; H02K 7/085
USPC ....................... 324/207.25, 143, 207.13, 219, 324/242–243, 246, 173–174
See application file for complete search history.

(56) References Cited

U.S. PATENT DOCUMENTS 4,818,907 A * 4/1989 Shirotori ..................... 310/67 R
6,025,665 A 2/2000 Poag et al.
(Continued)

FOREIGN PATENT DOCUMENTS

DE 102004004227 A1 8/2005
EP 1933155 A 6/2008
WO WO 2010116206 A1 * 10/2010

OTHER PUBLICATIONS

Tucholski, Sylvain, Oct. 2010, World Intellect, WO2010116206, A1.*

*Primary Examiner* — Patrick Assouad
*Assistant Examiner* — Taqi Nasir
(74) *Attorney, Agent, or Firm* — Bryan Peckjian; SKF USA Inc. Patent Dept.

(57) ABSTRACT

This support member (44) is for holding at least two sensors with respect to an encoder washer and forms one housing ($V_{445}$) adapted to accommodate the sensors next to each other. This housing ($V_{445}$) has at least two abutment surfaces (446, 447A-447E, 448A-448E) for positioning each of said sensors along two perpendicular directions (R2, R'2). The rotation detection set comprises an encoder washer adapted to rotate around a rotation axis, at least two sensors adapted to detect the rotation of the encoder washer around the rotation axis and a support member (44). The sensors are mounted in the housing ($V_{445}$) of the support member and immobilized within the housing.

14 Claims, 7 Drawing Sheets

(56) References Cited

U.S. PATENT DOCUMENTS

| | | |
|---|---|---|
| 6,225,716 B1 | 5/2001 | Sies et al. |
| 6,648,516 B2 | 11/2003 | Eriksson et al. |
| 7,375,511 B2 * | 5/2008 | Kang ............... 324/207.25 |
| 2006/0063403 A1 | 3/2006 | Kataoka et al. |

* cited by examiner

SUPPORT MEMBER, DETECTION SET COMPRISING SUCH A SUPPORT MEMBER, MANUFACTURING METHOD OF SUCH A DETECTION SET AND BEARING ASSEMBLY INCLUDING SUCH A DETECTION SET

CROSS-REFERENCE TO RELATED APPLICATIONS

This application is the U.S. national stage of International Application No.PCT/IB2010/003525 filed on Dec. 17, 2010, the contents of which are herein fullyincorporated by reference.

TECHNICAL FIELD OF THE INVENTION

This invention relates to a support member for holding at least two sensors with respect to a rotating encoder washer, such sensors being used to detect a rotation parameter of the encoder washer. This construction is particularly useful for detecting the rotation of a rotatable ring of a bearing with respect to a fixed ring.

The invention also relates to a rotation detection set which comprises, amongst others, an encoder washer, several sensors and a support member as mentioned here-above. The invention also concerns a manufacturing method for such a rotation detection set and a bearing assembly comprising a bearing, with a fixed ring and a rotatable ring, and a rotation detection set as mentioned here-above.

BACKGROUND OF THE INVENTION

Generally speaking, a bearing comprises an inner ring and an outer ring adapted to rotate around a rotation axis, one with respect to the other. In a plain bearing, the two rings are in sliding contact. In a rolling bearing, several rolling bodies are installed between the two rings. These rolling bodies can be balls, rollers or needles. Thus, a rolling bearing can be, for instance, a ball bearing, a roller bearing or a needle bearing.

In the field of bearings, it is known to use a tachometer in order to determine the rotation speed of a member supported by a bearing. As explained in EP-A-1 933 155, one can use an encoder washer with magnetic poles, fast in rotation with a rotatable ring of a bearing, and several sensors evenly distributed around the encoder washer and mounted onto a foldable printed circuit board installed within an outer body. The accuracy of the detection obtained by the respective sensors depends, amongst others, on the thickness of a radial air gap defined between the encoder washer and each sensor. In case of excentration of the sensors, that is if they are located at different radial distances with respect to the rotation axis of the encoder washer, the respective air gaps defined between the encoder washer and the sensors have different thicknesses, which implies that they detect different values for a rotating magnetic field generated by the encoder washer. This might lead to perturbations in the detection of the rotation of the encoder washer. The same applies if the rotation axis has transverse movements during rotation, for instance in case of unbalance of the rotatable ring.

SUMMARY OF THE INVENTION

The invention aims at solving these problems with a new support member which allows to accurately position several sensors with respect to an encoder washer and largely avoids variations of the air gap thickness between these sensors and the encoder washer.

To this end, the invention concerns a support member for holding at least two sensors with respect to an encoder washer wherein this support member forms one housing adapted to accommodate said sensors next to each other, said housing having at least two abutment surfaces for positioning each of said sensors along two perpendicular directions.

Thanks to the invention, the support member can accommodate the sensors in its housing and guarantee that they are correctly positioned thanks to their interaction with the two abutment surfaces. Since the sensors are accommodated next to each other in the housing, they can be located, with respect to the encoder washer, in an angular sector where the air gap does not substantially vary.

In the present description, unless otherwise specified, the words "axial", "radial", "axially" and "radially" relate to an axis which can be the axis of rotation of the encoder washer or a central axis defined by the support member. A direction is "axial" when it is parallel to such an axis and a direction or an axis is "radial" when it is perpendicular to and secant with such an axis.

According to further aspects of the invention which are advantageous but not compulsory, the support member might incorporate one or several of the following features, taken in any technically admissible configuration:
- The housing has a shape such that, when they are accommodated within the housing, the sensors are distributed around a central axis, whereas the abutment surfaces are adapted to block each sensor in translation along a radial axis and in rotation with respect to this central axis.
- The housing has a third abutment surface for positioning each of the sensors along a third direction parallel to the central axis.
- The housing defines slots for receiving individually a part of a sensor.
- The support member forms a second housing adapted to accommodate a printed circuit board connected to the sensors.

The invention also concerns a rotation detection set comprising an encoder washer, adapted to rotate around a rotation axis, at least two sensors, adapted to detect a rotation parameter of the encoder washer around the rotation axis, and a support member as mentioned here-above, the sensors being mounted in the housing of the support member and immobilized within this housing.

Such a detection set is more precise than the ones of the prior art insofar as the sensors are grouped within the housing, so that the respective air gaps defined between these sensors and the encoder washer have substantially the same thickness. Moreover, a sub-unit comprising, amongst others, the support member and the sensors can be easily manipulated in order, for instance, to be mounted onto a bearing.

According to advantageous aspects of the invention which are also not compulsory, the detection set might incorporate one or several of the following features, taken in any technically admissible configuration:
- The housing extends, with respect to the rotation axis, over an angular sector with a top angle having a value of less than 180°, preferably less than 90°. This top angle advantageously has a value less than a polar pitch of the encoder washer.
- The rotation detection set comprises a holder adapted to be inserted into the housing of the support member, this holder defining at least two recesses, each adapted to accommodate and hold a part of one sensor in position.
- The holder has an external shape substantially complementary to the shape of a wall of the housing of the support member.

Each recess of the holder has at least first and second abutment surfaces perpendicular to the rotation axis and a third abutment surface parallel to the rotation axis. This third abutment surface is advantageously adapted to interact with a face of a sensor in order to stop the sensor along an axis radial with respect to the rotation axis, in a first direction away from the rotation axis, whereas one of the two abutment surfaces of the housing is adapted to interact with another face of the sensor in order to stop the sensor along the radial axis, in a second direction towards the rotation axis.

The invention also concerns a method for manufacturing a rotation detection set as mentioned here-above and comprising a holder. This method includes at least the following steps:
  a) mounting of all sensors on the holder, and
  b) insertion of the holder equipped with the sensors into the housing of the support member.

Advantageously, this method comprises a step c) which is implemented prior to step b) and in which the sensors are connected to a printed circuit board.

Finally, the invention concerns a bearing assembly comprising a bearing, with a fixed ring and a rotatable ring, and a rotation detection set as mentioned here-above, the encoder washer of the rotation detection set being fast in rotation with the rotatable ring and the support member being fast in rotation with the fixed ring.

BRIEF DESCRIPTION OF THE DRAWINGS

The invention will be better understood on the basis of the following description which is given in correspondence with the annexed figures and as an illustrative example, without restricting the object of the invention. In the annexed figures.

DESCRIPTION OF SOME EMBODIMENTS

Figure 1:
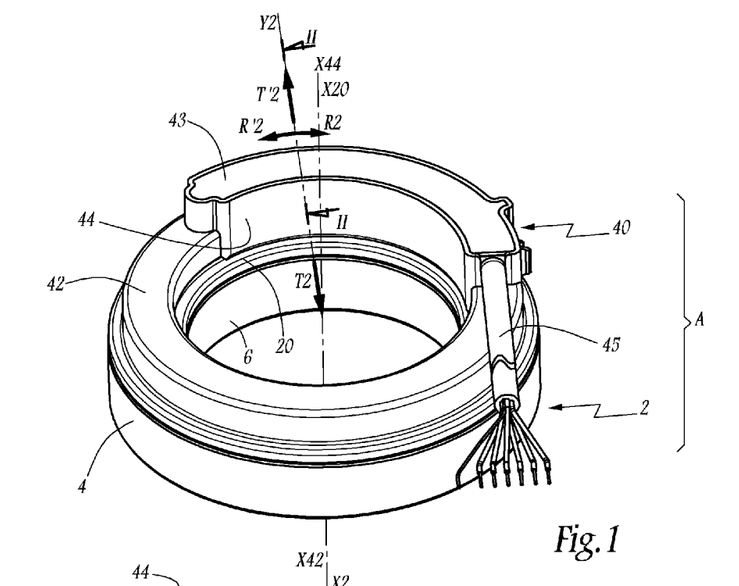
FIG. 1 is a perspective view of a rolling bearing assembly according to the invention.
Figure 2:
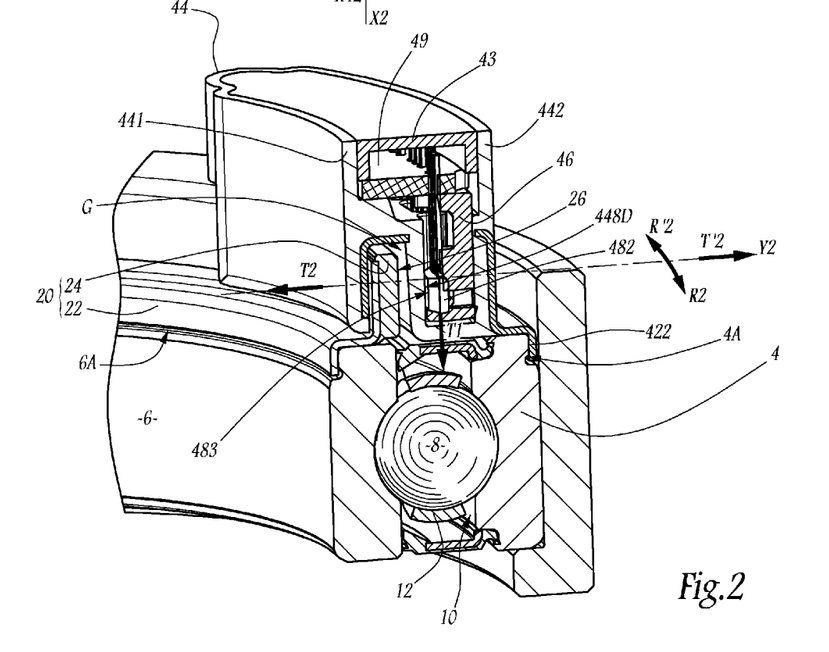
FIG. 2 is a partial cut view along line II-II on FIG. 1.
Figure 3:
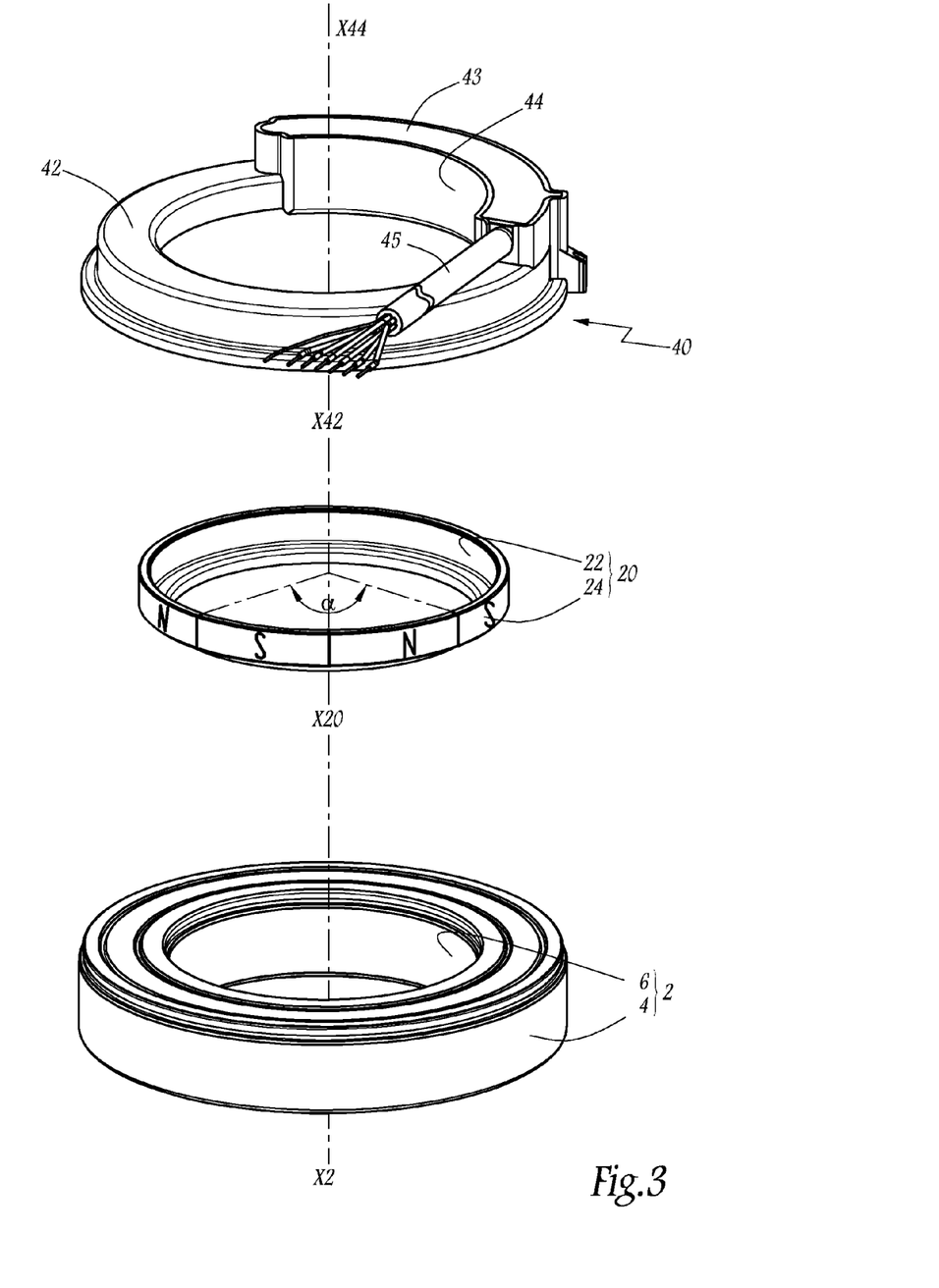
FIG. 3 is an exploded perspective view of the rolling bearing assembly of FIG. 1.
Figure 4:
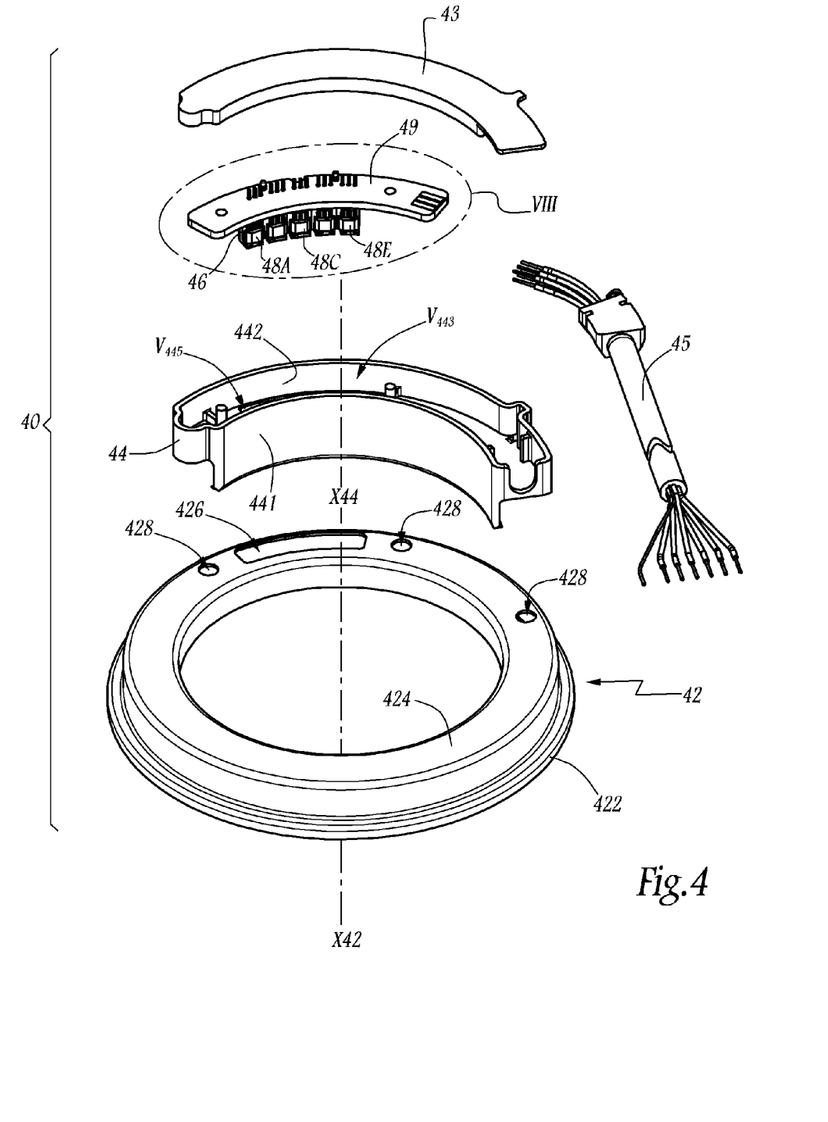
FIG. 4 is an exploded perspective view of a rotation detection device of a rotation detection set belonging to the rolling bearing assembly of FIGS. 1 to 3.
Figure 5:
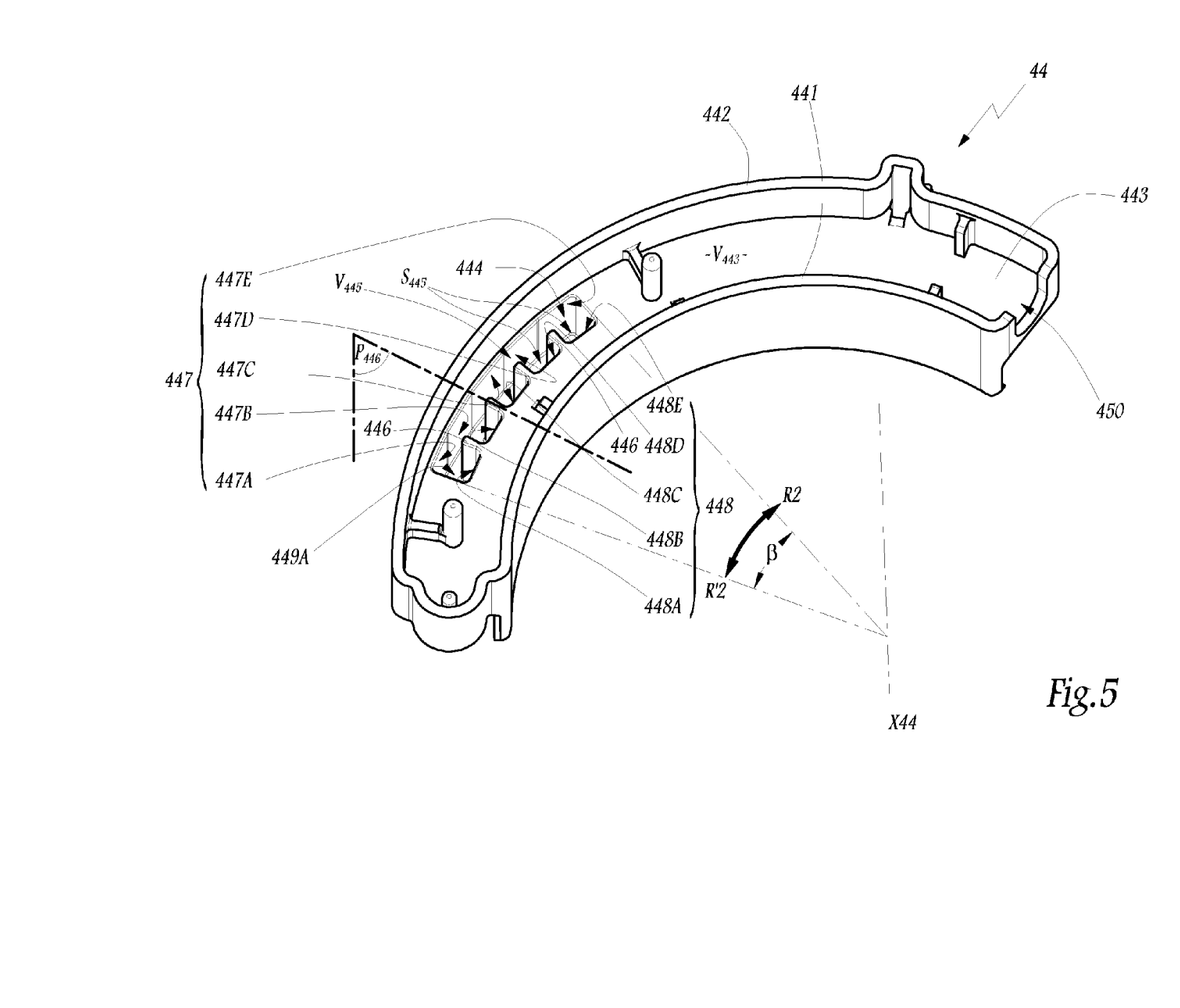
FIG. 5 is a perspective view of a support member of the rotation detection device of FIG. 4.
Figure 6:
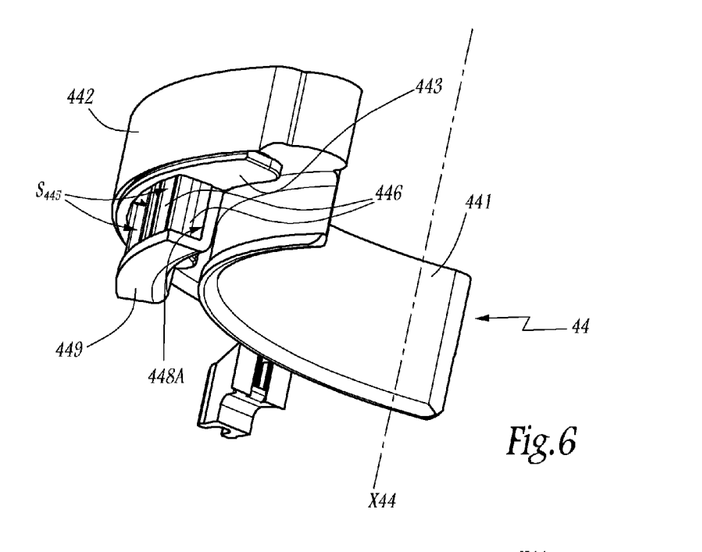
FIG. 6 is another perspective view, with a different angle, of the support member of FIG. 5.
Figure 7:
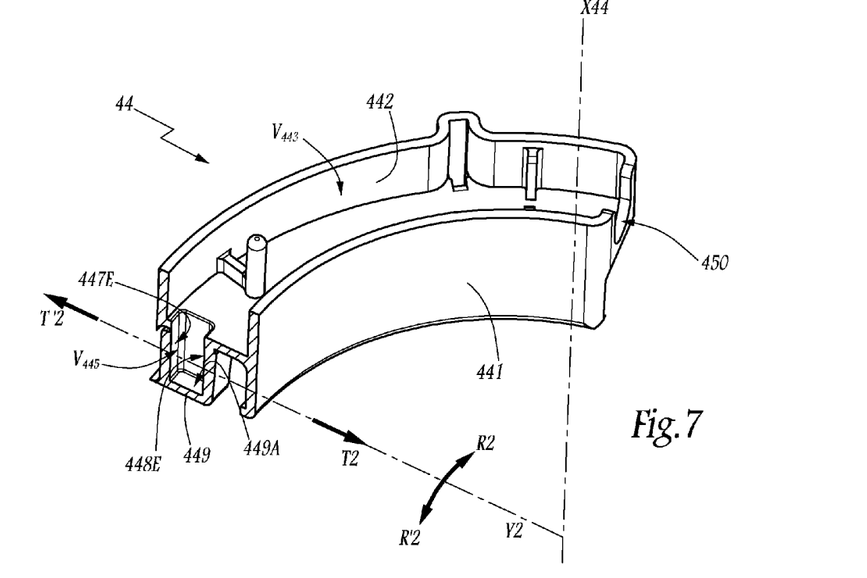
FIG. 7 is a cut and perspective view of the support member of FIG. 5.
Figure 8:
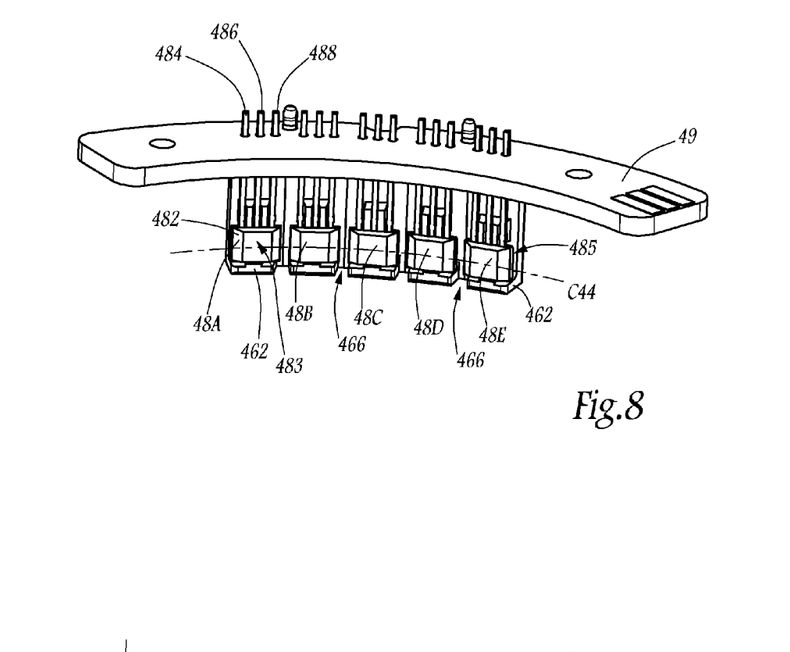
FIG. 8 is an enlarged view corresponding to detail VIII on FIG. 4 seen from another angle.
Figure 9:
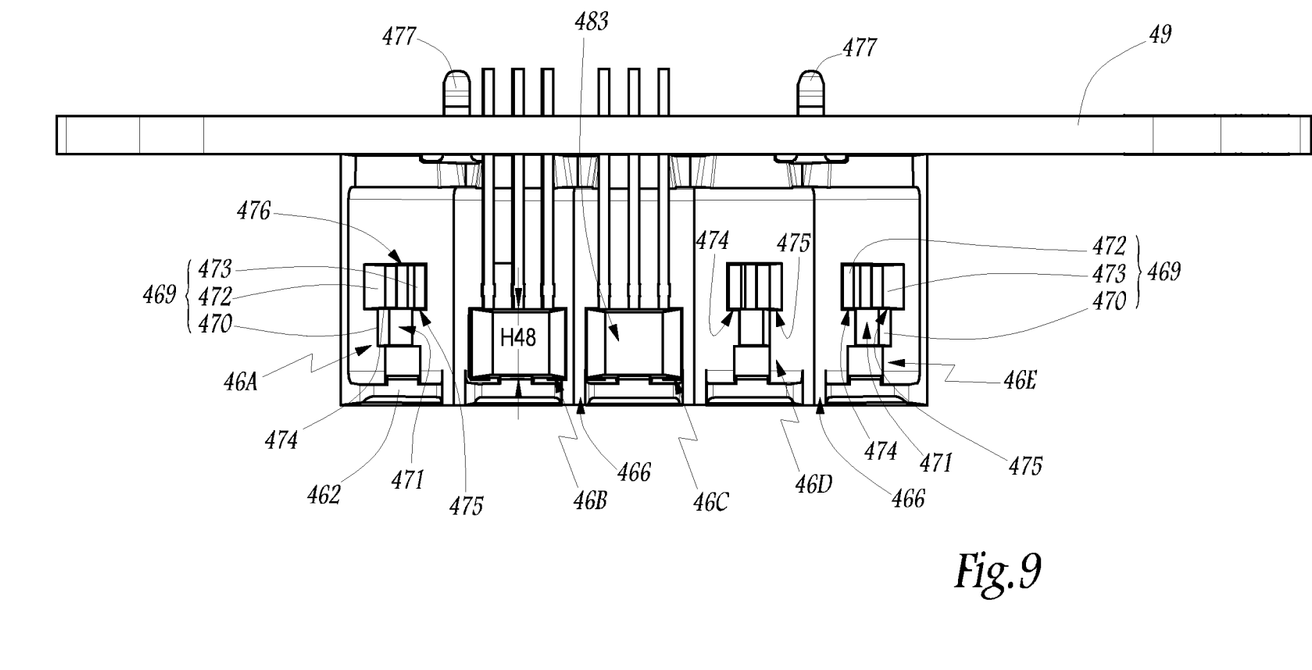
FIG. 9 is a front view of the part represented on FIG. 7 with some sensors removed.
Figure 10:
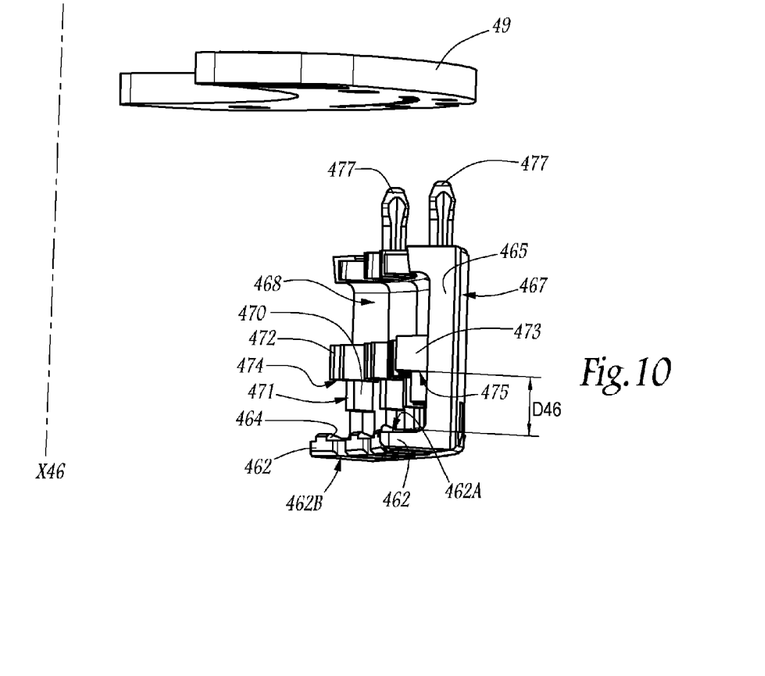
FIG. 10 is a perspective exploded view of some parts shown on FIGS. 7 and 8 with all sensors removed.

The rolling bearing assembly A represented on the figures comprises a rolling bearing 2 having a fixed outer ring 4 and an inner ring 6 rotating around a central axis X2 of rolling bearing 2. Several balls 8 forming rolling bodies are received within a chamber 10 defined between rings 4 and 6. These balls are held in position with respect to these rings by a cage 12.

An encoder washer 20 is fast in rotation with inner ring 6 and comprises a metallic armature 22 and a magnetic body 24 which defines several magnetic poles. Encoder washer 20 is centered on an axis X20 superimposed with axis X2 when encoder washer 20 is mounted onto inner ring 6 by snapping of armature 22 within an inner peripheral groove 6A of ring 6. The respective North and South poles, N and S, of magnetic body 24 are distributed around axis X20 and $\alpha$ denotes the polar pitch of these poles, that is the top angle of an angular sector comprising one North pole and one adjacent South pole. In the example of the figures, angle $\alpha$ equals 90°.

A sensing device 40 is mounted onto outer ring 4 in order to detect a rotation parameter of encoder washer 20 thanks to the variable magnetic field generated by this washer upon rotation. A rotation parameter can be a position, a speed, an acceleration or any parameter representative of the rotation of encoder washer 20 around axes X2 and X20.

Sensing device 40 includes an annular flange 42 having a peripheral skirt 422 adapted to be elastically snapped within an outer groove 4A of the outer ring. Flange 42 is centered on an axis X42 which is superimposed with axis X2 when sensing device 40 is mounted on rolling bearing 2. Flange 42 is provided with a flat wall 424 which is perpendicular to axis X42 and provided with an oblong opening or through hole 426, of an arcuate shape centered on axis X42.

Sensing device 40 also includes a support member 44 of an arcuate shape, having an inner wall 441 in the form of a section of a circular cylinder centered on an axis X44 which is superimposed with axes X2 and X42 when support member 44 is mounted onto flange 42 and sensing device 40 is mounted onto outer ring 4. Support member 44 also has an outer wall 442, which is parallel to inner wall 441, and a flat wall 443 which is perpendicular to axis X44 and lies against flat wall 424 when support member 44 is mounted onto flange 42. Flat wall 443 connects inner wall 441 to outer wall 442.

Three circular holes 428 are also provided on wall 424 in order to guarantee a robust mechanical anchorage of support member 44 onto flange 42. Indeed, when support member 44 is overmolded onto flange 42, some plastic material flows through holes 428 and remain there after solidification.

The geometry of support member 44 is defined in connection to axis X44. For the parts of support member 44, the words "axial" or "radial" are defined with respect to this axis.

Flat wall 443 has an arcuate opening 444 which communicates with the inside volume $V_{445}$ of a hollow extension 445 protruding from the side of flat wall 443 which is adapted to be mounted on flat wall 424 in a mounted configuration of sensing device 40.

The global shape of extension 445 is such that it can be inserted within opening 426 when support member 44 lies against flange 42. Thus, extension 445 is arcuate and centered on axis X44.

Five slots $S_{445}$ are defined within volume $V_{445}$ by four ribs 446. Each rib separates two adjacent slots $S_{445}$ and is centered on a plane $P_{446}$ which is radial with respect to axis X44.

The radial outer wall 447 of extension 445 is formed by five wall portions whose faces 447A to 447D oriented towards volume $V_{445}$ are flat and oriented at an angle of 7.2° with respect to the adjacent portion or portions. The radial inner wall 448 of extension 445 is formed by five wall portions whose faces 448A to 448D oriented towards volume $V_{445}$ are flat, each oriented at an angle of 7.2° with respect to the adjacent portion, and separated by a rib 446. Each rib 446 extends from wall 448 towards wall 447 on a length which is less than the radial distance between walls 447 and 448. Thus, the five slots $S_{445}$ are joined by an empty part of volume $V_{445}$ which extends continuously along wall 447.

449 denotes the bottom wall of extension 445, that is its wall opposite to opening 444. 449A denotes the upper face of wall 449 oriented towards volume $V_{445}$.

A holder 46 is provided for five sensors 48A to 48E which are identical. Each sensor 48A to 48E has a body 482 including a non represented detecting cell, such as a Hall effect cell. Each sensor also has three pins 484, 486 and 488 for its connection to a printed circuit board or PCB 49.

The holder 46 has five recesses 46A, 46B, 46C, 46D and 46E each adapted to accommodate and hold in position a body 482 of a respective sensor 48A to 48E. Each recess is defined between a sole plate 462, provided with a bevelled heal 464, and an extension 469.

Two sole plates 462 of two adjacent recesses are separated by a slit 466 adapted to accommodate a rib 446 when holder 46 is inserted within volume $V_{445}$.

Holder 46 has a wall 465 whose outer surface 467 is formed by five flat faces, with the same geometry as the flat faces 447A to 447E of wall 447. Thus, wall surface 467 is substantially complementary to wall 447. The inner face 468 of wall 465 is formed by five unitary flat faces and an extension 469 protrudes from each such flat portion.

X46 denotes a central axis of wall 465, that is an axis on which surface 468 is centered and which is parallel to this surface. Each extension 469 extends from surface 468 towards axis X46 and comprises a heal 470 with a flat surface 471 oriented towards and parallel to axis X46. Each extension 469 also includes two ribs 472 and 473 which define, between them, a slit 476 for the passage of a pin 486 of a sensor, the shape of these ribs 472 and 473 being such that the pins 484 and 488 of the same sensor can extend on either side of extension 469. 474 and 475 respectively denote the surfaces of ribs 472 and 473 oriented towards the sole plate 462 of the corresponding recess 46A to 46E. Surfaces 474 and 475 are perpendicular to axis X46.

462A and 462B respectively denote the upper and lower surfaces of the sub-plate 462. Surface 462A is oriented towards heal 470 and surface 462B is oriented opposite this heal. Surfaces 462A and 462B are perpendicular to axis X46.

The geometry of holder 46 is defined so that the axial distance D46, measure along axis X46, between the upper surface 462A of a sole plate 462 and the facing surfaces 474 and 475 of the corresponding extension 469 is equal or slightly superior to the height H48 of a body 482 measured in a direction parallel to the length of the pins 484 to 488. Thus, when it is in position within a recess 46A to 46E, the body 482 of a sensor 48A to 48E is immobilized along axis X46 between surfaces 462A, 474 and 475. As the holder 46 is also immobilized within volume $V_{445}$ by cooperation of the surfaces 462B of the sole plates 462 with the upper face 449A of bottom wall 449, each sensor body 482 is immobilized in a direction parallel to axes X2 and X44 in the mounted configuration of sensing device 40.

In other words, face 449A forms an abutment surface to accurately hold in position sensors 48A to 48E along axes X46, X44 and X2, in a direction of translation T1 away from wall 443.

Moreover, the geometry of holder 46 is chosen in such a way that, when it is in place within volume $V_{445}$, holder 46 presses the front face 483 of each body 482 against a wall portion face 448A to 448E of inner wall 448. This is obtained by a proper definition of the geometry of wall 465 and extensions 469. In particular, the position of each sensor 48A to 48E along an axis Y2 radial with respect to axis X2 and crossing the center of a face 448A to 448E is defined, in a direction towards axis X2, by the cooperation of its face 483 with one of faces 448A to 448E. In other words, each face 448A to 448 forms an abutment surface for a sensor body 482 in a direction of translation T2 towards axis X2, along axis Y2.

On the other hand, each sensor body is held along axis Y2, in a direction away from axis X2, by the fact that the rear face 485 of its body 482, that is its face opposite its front face 483, lies against the flat surface 471 of a heal 470 and by the fact that the holder 46 is held along axis Y2, in the same direction, by the cooperation of its outer surface 467 with the flat faces 447A to 447E of wall 447. In other words, each face 447A to 447E forms, via wall 465, an abutment surface for the sensors 48A to 48E in a direction of translation T'2 away from axis X2, along axis Y2.

The angular position of each sensor 48 with respect to axis X2 is also determined by support member 44. The angular position of each sensor with respect to holder 46 is fixed by the fact that the sensor bodies 482 are immobilized within the recesses 46A to 46E. On the other hand, the holder 46 is immobilized angularly around axis X44 within volume $V_{445}$ by cooperation of shapes with support member 44. In particular, ribs 446 and slits 466 cooperate to immobilize the holder 46 around axes X46, X44 and X2 when sensing device 40 is mounted on bearing 2. Thus, the sides of the ribs 446 form abutment surfaces for positioning sensors 48A to 48E in rotation with respect to axes X44, X46 and X2, along two opposite directions of rotation R2 and R'2.

In addition, the sensor bodies 482 are each individually received within a slot $S_{445}$.

When they are received within volume $V_{445}$, sensors 48A to 48E are distributed on an arc of a geometrical circle C44 centered on axes X44 and X46.

Volume $V_{445}$ extends on an angular sector with respect to axis X44 whose top angle $\beta$ is less than 90°, in practice of about 40°. Thus, all sensors 48A to 48E are grouped in an angular sector whose top angle $\beta$ has a value less than the polar pitch $\alpha$ of encoder washer 20.

Actually, depending on the polar pitch $\alpha$ and the number of sensors, the value of angle $\beta$ can be chosen less than 180°, preferably less than 90°.

When holder 46 is in place within volume $V_{445}$, PCB 49 lies within a volume $V_{443}$ which is defined between walls 441 and 442, on the side of flat wall 443 opposite to extension 445. This volume $V_{443}$ forms a housing for this PCB. The ends of a multiconductor cable 45 are connected to PCB 49 within volume $V_{443}$ and cable 45 enters volume $V_{443}$ via a slot 450 of support member 44.

A rotation detection set according to the invention includes an encoder washer 20 and sensing device 40. During manufacturing of this rotation detection set, the sensors 48A to 48E are mounted onto the holder 46 by pressing their respective bodies 482 within the recesses 46A to 46E with their pins extending along the ribs 472 and 473. The bevelled heals 464 help holding the bodies 482 within the recesses. Then, the PCB 49 is mounted onto the holder 46 by inserting two lugs 477 and the pins 484, 486 and 488 within corresponding holes of the PCB 49. Connection of the pins of the sensors to the PCB can then be made by soldering.

The sub-assembly made of parts 46, 48A-48E and 49 can be easily manipulated while the respective positions of the sensors 48A to 48E one with respect to the other are held by holder 46. It is then possible to connect PCB 49 to cable 45 and to push holder 46 within volume $V_{445}$ and PCB 49 and the end of cable 45 within volume $V_{443}$.

Volume $V_{443}$ can then be closed with a cover 43.

Support member 44 equipped with items 43, 45, 46, 48A to 48E and 49 is compact and can then be mounted onto flange 42 to finalize rotation detecting device 40, ready to be used with encoder washer 20.

Then, when it is necessary to know a rotation parameter of inner ring 6 with respect to outer ring 4, one mounts encoder washer 20 onto inner ring 6 and rotation detection device 40 onto outer ring 4. Cable 45 is then connected to a proper non represented electronic control unit.

In the device of the invention, since the sensors 48A to 48E are grouped within the housing $V_{445}$ of the support member 44, the air gap G between these sensors and the outer surface 26 of the encoder washer 20 is constant or substantially constant from one sensor to another. Thus, in case of excentration of the encoder washer or transverse movement of the central axis X2, the accuracy of the detection of the rotation of the inner ring is not substantially decreased. Moreover, support member 44 is compact, insofar as it extends over a limited angle with respect to axis X2. In particular, support member 44 is much less bulky than a circumferential support member which would extend over 360° with respect to axis X2.

According to a non represented embodiment of the invention, support member 44 can be overmolded over flange 42.

Even if it is particularly advantageous, holder 46 is optional. It is possible to install individually the sensors 48A to 48E within the housing $V_{445}$, provided that the internal shape of extension 445 is adapted to efficiently hold each sensor in position. This is the case if the housing has slots.

The invention is represented with five sensors. However, it can be implemented with one or several sensors, whose number can be different from five. The sensors can be connected to cable 45 directly, that is without PCB 49.

The invention has been represented with a rolling bearing. However, it is also usable with a plain bearing.

The invention has been represented with a fixed outer ring and a rotating inner ring. However, it is also usable with a fixed inner ring and a rotating outer ring.

The invention claimed is:

1. A support member for holding at least two sensors disposed next to each other and in proximity to an encoder washer, the support member comprising:
   a support member housing having an arcuate shape configured to attach to an outer ring of a bearing, the support member housing having a flat wall oriented perpendicular to a central axis and defining a single opening;
   a support member extension attached to the flat wall and in communication with the single opening and adapted to accommodate the sensors, the support member extension being configured for positioning each of the sensors along two perpendicular directions, the support member extension comprising an extension bottom wall spaced from the flat wall and connected thereto by a radially inner wall and by a radially outer wall to form a volume for receiving the sensors,
   a plurality of ribs are located on the radially inner wall and extend toward the radially outer wall for a length which is less than a radial distance between the radially inner wall and the radially outer wall such that the extension defines a plurality of slots for receiving the sensors that are each joined by an empty part of the volume which extends continuously along the radially outer wall, the plurality of slots are distributed around a central axis and are adapted to block each sensor in translation along an axis radial with respect to the central axis and in rotation with respect to the central axis.

2. The support member according to claim 1 wherein the support member housing extends, with respect to the rotation axis, over an angular sector with a top angle having a value of less than one hundred eighty degrees (180°).

3. The support member according to claim 2, wherein the support member housing extends, with respect to the rotation axis, over an angular sector with a top angle having a value less than a polar pitch of the encoder washer.

4. The support member according to claim 1, wherein the support member housing extends, with respect to the rotation axis, over an angular sector with a top angle having a value of less than ninety degrees (90°).

5. The support member according to claim 1, further comprising a second housing adapted to accommodate a printed circuit board connected to the sensors.

6. A rotation detection set comprising:
   an encoder washer adapted to rotate around a rotation axis,
   a plurality of sensors;
   a support member housing having an arcuate shape configured to attach to an outer ring of a bearing, the support member housing having a flat wall oriented perpendicular to a central axis and defining a single opening;
   a support member extension attached to the flat wall and in communication with the single opening and adapted to accommodate the sensors, the support member extension being configured for positioning each of the sensors along two perpendicular directions, the support member extension comprising an extension bottom wall spaced from the flat wall and connected thereto by a radially inner wall and by a radially outer wall to form a volume for receiving the sensors; and
   a plurality of ribs are located on the radially inner wall and extend toward the radially outer wall for a length which is less than a radial distance between the radially inner wall and the radially outer wall such that the extension defines a plurality of slots for receiving the sensors that are each joined by an empty part of the volume which extends continuously along the radially outer wall, the plurality of slots are distributed around a central axis and are adapted to block each sensor in translation along an axis radial with respect to the central axis and in rotation with respect to the central axis.

7. The rotation detection set according to claim 6, wherein the support member housing extends, with respect to the rotation axis, over an angular sector with a top angle having a value of less than one hundred eighty degrees (180°).

8. The rotation detection set according to claim 7, wherein the support member housing extends, with respect to the rotation axis, over an angular sector with a top angle having a value less than a polar pitch of the encoder washer.

9. The rotation detection set according to claim 8, further comprising a holder adapted to be inserted into the support member housing, the holder defining at least two recesses, each adapted to accommodate and hold a part of one sensor in position.

10. The rotation detection set according to claim 9, wherein the holder has an external shape substantially complementary to the shape of a wall of the support member housing of.

11. A method for manufacturing a rotation detection set having a holder adapted to be inserted into a support member housing, the holder defining at least two recesses, each adapted to accommodate and hold a part of one sensor in position, the method comprising the following steps:
   a) mounting multiple sensors on the holder;
   b) insertion of the holder equipped with the sensors into the housing of the support member;
   c) providing the support member housing, comprising:
      the support member housing having an arcuate shape configured to attach to an outer ring of a bearing, the support member housing having a flat wall oriented perpendicular to a central axis and defining a single opening;
      a support member extension attached to the flat wall and in communication with the single opening and adapted to accommodate the sensors, the support member extension being configured for positioning each of the sensors along two perpendicular directions, the support member extension comprising an extension bottom wall spaced from the flat wall and connected thereto by a radially inner wall and by a radially outer wall to form a volume for receiving the sensors, a plurality of ribs are located on the radially inner wall and extend toward the radially outer wall for a length which is less than a radial distance between the radially inner wall and the radially outer wall such that the extension defines a plurality of slots for receiving the sensors that are each joined by an empty part of the volume which extends continuously along the radially outer wall, the plurality of slots are distributed around a central axis and are adapted to block each sensor in translation along an axis radial with respect to the central axis and in rotation with respect to the central axis.

12. The method according to claim 11, further comprising connecting the sensors to a printed circuit board prior to insertion of the holder equipped with the sensors into the support member housing.

13. A bearing assembly comprising:
a bearing, with a fixed ring and a rotatable ring, and
a rotation detection set providing an encoder washer adapted to rotate around a rotation axis,
a plurality of sensors adapted to detect a rotation parameter of the encoder washer around the rotation axis, and
a support member housing having an arcuate shape, the support member housing having a flat wall oriented perpendicular to a central axis and defining a single opening;
a support member extension attached to the flat wall and in communication with the single opening and adapted to accommodate the sensors, the support member extension being configured for positioning each of the sensors along two perpendicular directions, the support member extension comprising an extension bottom wall spaced from the flat wall and connected thereto by a radially inner wall and by a radially outer wall to form a volume for receiving the sensors, a plurality of ribs are located on the radially inner wall and extend toward the radially outer wall for a length which is less than a radial distance between the radially inner wall and the radially outer wall such that the extension defines a plurality of slots for receiving the sensors that are each joined by an empty part of the volume which extends continuously along the radially outer wall, the plurality of slots are distributed around a central axis and are adapted to block each sensor in translation along an axis radial with respect to the central axis and in rotation with respect to the central axis, wherein the encoder washer of the rotation detection set being rotatably fastened with the rotatable ring and the support member housing of the rotation detection set being rotatably fastened with the fixed ring.

14. The rotation detection set according to claim 6, wherein the housing extends, with respect to the rotation axis, over an angular sector with a top angle having a value less than ninety degrees (90°).

* * * * *